United States Patent [19]
Mayer et al.

[11] 3,881,450
[45] May 6, 1975

[54] STEAM GENERATOR

[75] Inventors: Hans Mayer, Bubenreuth; Heinz-Jurgen Schroeder, Erlangen, both of Germany

[73] Assignee: Siemens Aktiengesellschaft, Munich, Germany

[22] Filed: June 12, 1973

[21] Appl. No.: 369,192

[30] Foreign Application Priority Data
June 26, 1972 Germany............................ 2231235

[52] U.S. Cl..................................... 122/32; 122/34
[51] Int. Cl................................................ F22b 1/06
[58] Field of Search........................... 122/32, 33, 34

[56] References Cited
UNITED STATES PATENTS
3,706,301 12/1972 Penfield, Jr............................ 122/32
3,724,532 4/1973 Sprague................................. 122/34

Primary Examiner—Kenneth W. Sprague
Attorney, Agent, or Firm—Kenyon & Kenyon Reilly Carr & Chapin

[57] ABSTRACT

A pressurized-water coolant nuclear reactor steam generator has a vertical housing for the steam generating water and containing an upstanding heat exchanger through which the pressurized-water coolant passes and which is radially surrounded by a guide jacket supporting a water separator on its top. By thermo-siphon action the steam generating water flows upward through and around the heat exchanger within the guide chamber to the latter's top from which it flows radially outwardly and downwardly through a down-draft space formed between the outside of the jacket and the housing, to the bottom of the guide jacket for return upwardly therethrough. The water separator discharges separated water towards the outside of the guide jacket to mix with the water which flows downwardly. The housing has a feed water inlet opening adjacent to the lower portion of the heat exchanger around which, via a preheater, the feed water flows, providing preheating of the introduced feed water. However, all of the feed water required is not sent through the preheater for preheating, a portion being introduced directly and mixed with the separated water discharged by the water separator, this portion being proportioned as required to condense any steam carried along with the separated water discharged by the water separator.

6 Claims, 4 Drawing Figures

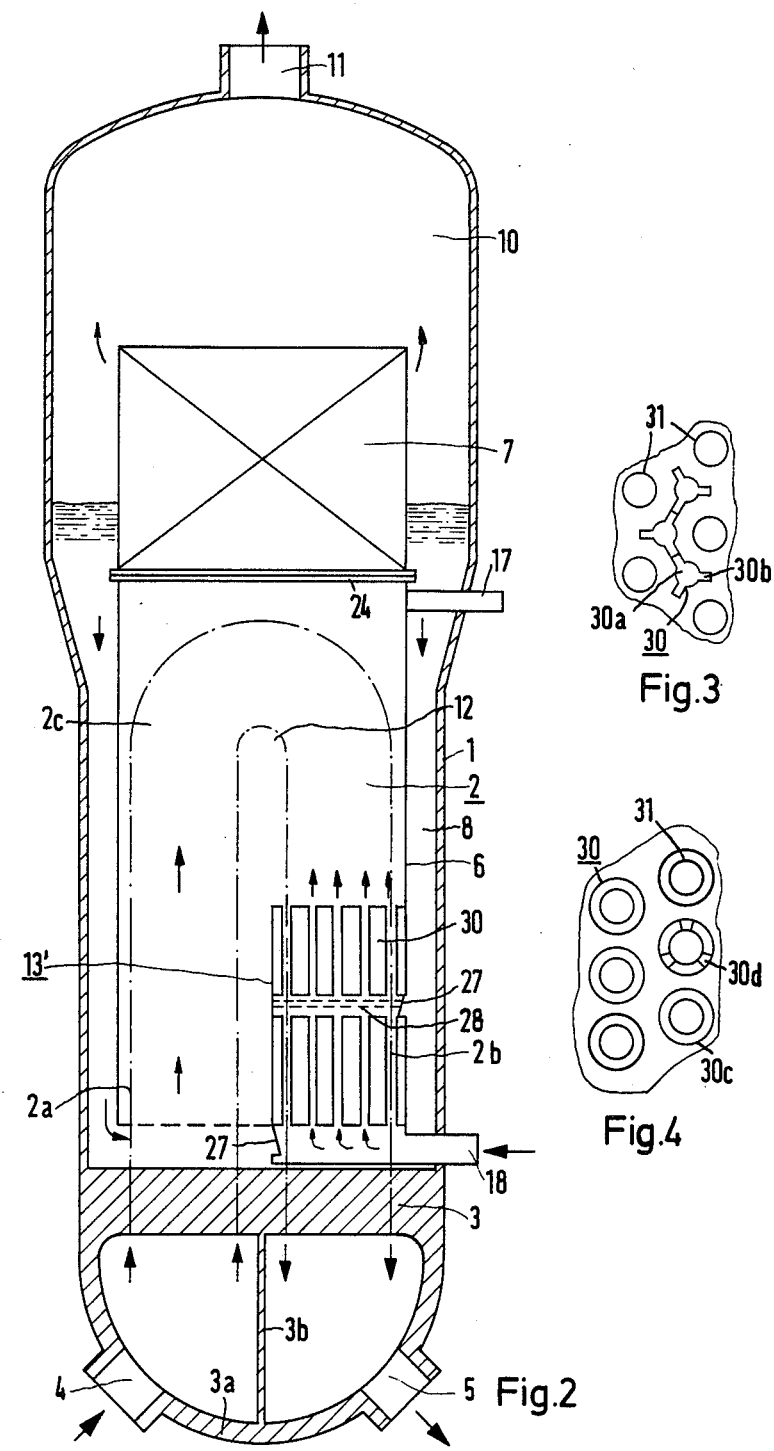

STEAM GENERATOR

BACKGROUND OF THE INVENTION

A pressurized-water coolant nuclear reactor steam generator includes a vertical housing for the steam generating water and containing an inverted U-shaped nest of heat exchanging tubes having inlet and outlet ends and radially enclosed by a vertical jacket which guides the steam generating water upwardly. The jacket's top supports a water separator. The housing forms a down-draft space around the jacket and has a feed water inlet adjacent to the outlet end of the nest, the separator discharging water separated from the steam, downwardly into a chamber for mixing with the steam generating water. The inlet and outlet ends of the nest are in circuit with the coolant circuit of the nuclear reactor.

Preheating of the feed water effected by its introduction adjacent to the heat exchanger's outlet end via a preheater heated by this end, increases the thermal efficiency of the steam generator.

The water separator discharges water mixed with steam, the water and steam mixture being discharged adjacent to and mixing with the uppermost level of the water in the housing, making the detection and maintenance of this upper water level difficult because of the steam and causing other trouble.

It is possible to introduce the feed water to the housing without preheating and adjacent to the upper level of the water in the housing, this inlet water being directed to mix with the mixture of water and steam discharged by the water separator. This condenses the steam in this discharged water so that the water in the housing is solid and free from steam, making detection and maintenance of its upper level less troublesome and causing the water circulation in the housing to be improved. However, the full advantage of the preheating is lost.

SUMMARY OF THE INVENTION

One object of the present invention is to provide an improvement permitting adequate condensation of the steam from the water and steam mixture discharged by the water separator while at the same time retaining completely or to a substantial degree the full advantage of the preheating.

According to the invention, this improvement is effected by providing means for conducting a portion of the required feed water, introduced through an inlet in the lower part of the housing, through or around the nest of tubes adjacent to the outlet end of the nest to preheat this portion of the feed water, with the preheated feed water then being introduced into the guide jacket and mixed with the water going upwardly therethrough. The balance of the required feed water is introduced directly without preheating and mixed with the mixture of water and steam discharged by the water separator in the upper portion of the housing. In this way the steam is condensed from the mixture. The amount introduced for this steam condensation purpose need be only sufficient to achieve this purpose, the main portion being introduced via the preheater. At the same time, this water used for steam condensation purposes is, incidentally, also preheated so that the efficiency of the steam generator is not reduced substantially, if at all.

The housing need have only one feed water inlet, this inlet supplying both the preheater and a duct which extends upwardly in the down-draft space around the guide jacket and to the water separator's discharge area. The water separator discharges the condensed water and steam mixture into a connecting chamber, and this chamber may be associated with a second chamber to which the upwardly conducted feed water which is not preheated connects via a second chamber, the two chambers being interconnected by a wall providing a pluurality of orifices through which the feed water used for the steam condensation enters the water separator's discharge chamber to obtain effective intermixing. The solid water thus produced is discharged into the upper portion of the water in the housing and which is being returned through the down-draft space.

BRIEF DESCRIPTION OF THE DRAWINGS

The accompanying drawings schematically illustrate preferred embodiments of the present invention, as follows:

FIG. 2 is the same as FIG. 1 but shows a second embodiment;

FIG. 3 is a cross section of a segment of one form of prehater; and

FIG. 4 is a cross section of a second form of preheater, both FIGS. 3 and 4 being on an enlarged scale and showing only portions of the preheaters.

DESCRIPTION OF THE PREFERRED EMBODIMENTS

Figure 1:
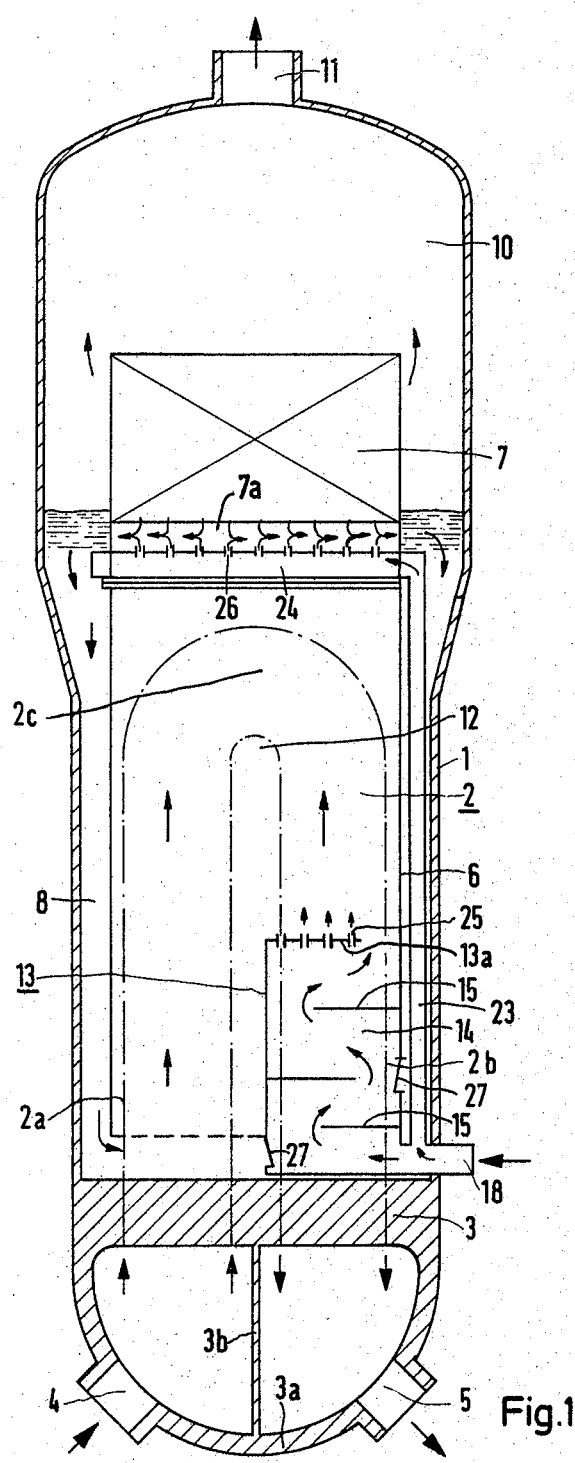
FIG. 1 is a vertical section showing a first embodiment of the invention.

Having reference first to FIG. 1 of the above drawings, the steam generator has a generally cylindrical elongated vertical housing 1 containing the U-shaped nest 2 of heat exchanging tubes which, to avoid confusion, is shown only in outline by dash-dot-dash lines. The inlet end of the nest is via the bottom of the left-hand leg 2a and the outlet end of the nest is via the bottom of the right-hand leg 2b, these legs extending vertically for a substantial distance upwardly within the housing 1, joining by a curved portion 2c, and having their inlet and outlet ends mounted in a horizontal tube plate 3, which together with the hemispherical bottom 3a of the housing, forms two chambers separated from each other by a vertical wall 3b. The pressurized-water coolant from the reactor (not shown) is introduced through the inlet 4 where it flows from the left-hand chamber into the inlet end of the left-hand nest leg 2a, the coolant going upwardly around the curve and downwardly and from the outlet end and flowing into the right-hand one of the two chambers mentioned and out from the outlet 5 for return to the reactor.

Conventionally, a pressurized-water reactor coolant is light water under a pressure of, for example, 150 kg/cm$^2$ with temperatures of about 300°C. The walls 3 and 3a, and the heat exchanging tube nest 2 must be capable of resisting such pressures and temperatures. The pressure differential on opposite sides of the wall 3b is not excessive.

The tube nest 2 is radially enclosed by a cylindrical tubular guide jacket 6 which extends from the bottom portion of the nest to above its top, and the top of this jacket supports a water separator 7. Between the outside of this jacket and the inside of the housing a so-called down-draft space 8 is defined, the bottom of this space communicating with the inside of the jacket and the water flowing upwardly within the latter for evaporation and the production of steam which passes upwardly through the water separator 7, the steam freed from water collecting in the steam dome 10 from which it is sent to do useful work via an outlet 11. The main steam generation occurs in the space 12.

The preheater is generally indicated schematically at 13. Walls 13a form a chamber extending inwardly from the jacket 6 and surrounding a substantial portion of the leg 2b of the heat exchanging tube nest, which receives the coolant via the curve 2c in the inverted U-shaped nest. The bottom of the chamber defining the heat exchanger 13 is close to the top of the housing's wall 3 and the chamber extends upwardly for a substantial portion of the length of the leg 2b. The steam generator's feed water inlet 18 connects with the bottom of this chamber and is undulatingly deflected back and forth through the medium of baffles 15 inside of the chamber so as to pass back and forth between the heat exchanging tubes moving upwardly.

Inside of the steam generator's housing 1 a conduit 23 connects with the inlet 18, by-passing the preheater 13, and extends upwardly in the down-draft space 8 to above the heat exchanger 2 and adjacently below the water separator 7, where the conduit connects with a chamber 24. The top wall 13a of the preheater is provided with a number of upwardly directed orifices or openings 25 which equalize or distribute the flow of preheated water leaving the preheater 13 and entering the space 12 within the guide jacket 6 where the steam generating water is boiling.

The top of the chamber 24 is provided with a number of upwardly directed openings or orifices 26 which eject the water from the chamber 24 upwardly into a chamber 7a receiving the discharged mixture of separated water and steam from the water separator 7. Thus, the water in the chamber 24 received directly from the feed water inlet 18 is mixed with the hotter water and steam mixture in the chamber 7a and effectively condenses the steam in this mixture. The water freed from steam and in a solid condition, is then discharged into the upper level of the boiling water. Therefore, this upper level of water, being free from steam, may be easily detected so that its level may be maintained at the height desired.

The larger portion of the feed water required to maintain the level of the steam generating water goes through the preheater 13. The portion by-passing through the duct 23, and which is not preheated, is just sufficient to effect the steam condensation purpose desired. The proportioning may be effected by proper design of the flow conducting ability of the duct 23 or by a controlling valve (not shown).

The walls 13a of the preheater 13 are provided with pressure-responsive valves or vanes 27 which open if the pressure differential between the water in the preheater and that within the guide jacket 6 and housing 1 becomes excessive. In this way the walls 13a of the preheater 13 do not have to carry or sustain high fluid pressures.

In the first embodiment of FIG. 1 the water is preheated by being caused to flow transversely with respect to the tubes of the leg 2b. The flow is undulating back and forth and, of course, upwardly, but only while changing direction.

In the embodiment of FIG. 2, the preheater conducts the feed water longitudinally or axially with respect to the tube's of the tube nest leg 2b. The water used for condensing the steam from the discharge of the separator 7, is in this instance directly introduced via an inlet connection 17, in the upper part of the housing 1, this being mixed with the water separator's discharge in the same manner as illustrated in FIG. 1.

In this second embodiment the heat exchanger 13' is formed by walls which are parallel to the tubes of the leg 2b of the heat exchanger. These walls are tubular, are arranged as a multiplicity of levels with their adjacent ends suitably interconnected, and extend either between or around the tubes of the tube nest leg 2b.

As shown by FIG. 3, walls 30 extend upwardly between the tubes 31 of the leg 2b and are in the form of identical sectional shapes, each comprising a tubular section 30a from which three projections 20b of rectangular cross section extend radially, the tube 30a being cylindrical and the projections extending at 120° angles with respect to each other. Such shapes can be assembled with their projections interconnected to form a plurality of vertically extending tube walls 30 extending between the tubes 31.

Another form, shown by FIG. 4, may have the tube walls 30 encircling the tubes 31 in interspaced relationship. In this instance the walls or tubes 30c encircling the heat exchanger's tubes 31 are symmetrically spaced from the latter by projections 30d.

In both of these forms of FIGS. 3 and 4 the mutually adjacent ends must be interconnected by a chamber. To prevent vibrations of the tubes 31, one or more straps 28 may be used to strap them together.

In these embodiments of the invention the pressurized-water coolant supplied by the reactor may be considered as the primary liquid and the feed water and the water boiling in the housing then considered to be the secondary liquid.

It is to be noted that in the case of the preheater shown by the FIG. 1 embodiment, the preheater walls enclose a plurality or all of the heat exchanger's tubes and the transverse and undulating flow is provided. On the other hand in the case of the preheater of the modification of FIG. 2, shown in detail by FIGS. 3 and 4, the walls of the preheater are formed by individual tubes extending parallel with respect to the heat exchanger's tubes. In FIG. 4 these walls are tubes of larger diameters than the heat exchanger's tubes and enclose the latter individually.

What is claimed is:

1. A pressurized-water coolant nuclear reactor steam generator including a vertical housing containing an inverted U-shaped nest of heat-exchanging tubes having coolant inlet and outlet ends and radially enclosed by a vertical guide jacket having its top provided with a water separator for the generated steam, said housing forming a water down-draft space around said jacket and having a feed water inlet adjacent to said nest's outlet end and said separator discharging separated water mixed with steam into a chamber from which it flows into the upper level portion of the steam-generating water fed into said housing, and a preheater receiving heat from said nest's outlet end and through which feed water from said inlet is conducted for preheating before introduction to said steam-generating water; wherein the improvement comprises means for feeding a portion of the required feed water without preheating to said chamber and mixing it with said separated water and steam in amounts condensing substantially its steam content.

2. The steam generator of claim 1 in which said means is formed by a conduit extending from said inlet up through said down-draft space within said housing to said chamber.

3. The steam generator of claim 1 in which said pre-heater has flow paths for said feed water which extend upwardly in heat-exchanging relationship with said heat-exchanging tube nest's outlet end.

4. The steam generator of claim 3 in which said walls extend parallel with the tubes of said nest's outlet end.

5. The steam generator of claim 3 in which said walls enclose individually the tubes of said tube-nest's outlet end.

6. The steam generator of claim 4 in which said walls are tubular with radially extending portions which interconnect and are positioned between the tubes of said tube nest.

* * * * *